(12) United States Patent
Stephens

(10) Patent No.: US 8,095,447 B2
(45) Date of Patent: Jan. 10, 2012

(54) METHODS AND APPARATUS FOR SELF-ADAPTIVE, LEARNING DATA ANALYSIS

(75) Inventor: Christopher R. Stephens, San Nicolas (MX)

(73) Assignee: Adaptive Technologies, Ltd., Phoenix, AZ (US)

( * ) Notice: Subject to any disclaimer, the term of this patent is extended or adjusted under 35 U.S.C. 154(b) by 740 days.

(21) Appl. No.: 12/029,056

(22) Filed: Feb. 11, 2008

(65) Prior Publication Data

US 2010/0030720 A1    Feb. 4, 2010

Related U.S. Application Data

(63) Continuation-in-part of application No. 09/504,939, filed on Feb. 16, 2000.

(60) Provisional application No. 60/889,048, filed on Feb. 9, 2007.

(51) Int. Cl.
*G06Q 40/00* (2006.01)
(52) U.S. Cl. .................................. 705/36 R
(58) Field of Classification Search ............... 705/35–45
See application file for complete search history.

(56) References Cited

U.S. PATENT DOCUMENTS

| 5,706,406 | A | | 1/1998 | Pollock |
| 5,920,848 | A | * | 7/1999 | Schutzer et al. ................. 705/42 |
| 6,963,854 | B1 | * | 11/2005 | Boyd et al. ...................... 705/37 |
| 2003/0018558 | A1 | * | 1/2003 | Heffner et al. .................. 705/37 |

OTHER PUBLICATIONS

Methods for dynamic classifier selection by Giacinto and Roli, Sep. 1999 at http://www.diee.unica.it/~giacinto/PAPERS/ICIAP99.selection.pdf.*

* cited by examiner

*Primary Examiner* — Rajesh Khattar
(74) *Attorney, Agent, or Firm* — The Noblitt Group, PLLC

(57) ABSTRACT

Methods and apparatus for analyzing financial data generally includes a predictive modeling system. The predictive modeling system may include an artificial agent responsive to an input data set. The artificial agent may produce an estimated data set including a market conditions data set. The market conditions data may include an estimate of at least one of liquidity of a market, strategy of a counterparty, and an effect of information leakage. The artificial agent may determine a predictability value for the estimated data set. The predictive modeling system may also include an agent factory responsive to the input data set. The agent factory may generate an artificial agent in response to the input data set.

22 Claims, 4 Drawing Sheets

METHODS AND APPARATUS FOR SELF-ADAPTIVE, LEARNING DATA ANALYSIS

CROSS-REFERENCES TO RELATED APPLICATIONS

This application claims the benefit of U.S. Provisional Patent Application No. 60/889,048, filed Feb. 9, 2007, and is a continuation-in-part of U.S. Nonprovisional application Ser. No. 09/504,939, filed Feb. 16, 2000, and incorporates the disclosure of both applications by reference.

BACKGROUND OF INVENTION

At least partial automation is being applied in a growing range of fields, improving the efficiency of industrial processes and raising productivity in a dramatic way. This improvement has not been fully matched in the service sector, in part because many of the tasks carried out in the services industry are perceived to require intelligent reasoning and skills that are not easily emulated by machines.

This is particularly true in finance where fundamental analysis has been a human function, and traditional technical analysis has also relied on humans to interpret results. Many technical analysis tools are available, but these are often relatively unsophisticated systems that are viewed as "toys" by more quantitatively-minded analysts. While there are comparatively better systems that provide a large amount of potentially useful information, these systems are not true predictive systems, because they ultimately rely on heuristic rules that cannot have global validity over time in a constantly changing financial Market.

A large part of finance is associated with trying to predict what will happen in the future. Both fundamental analysis and technical analysis are concerned with the question of prediction of the price of a financial instrument, but approach it from completely different points of view. Traditional economic theory (the Efficient Markets hypothesis) states that prices efficiently encode the available information about an instrument. An oft stated corollary of this is that price movements in markets are unpredictable in that past behavior of price cannot be used to predict future movements. Mounting evidence, however, suggests that markets are not completely efficient or rational. Any system that can take advantage of such inefficiencies might be capable of permanent profit making.

Unfortunately, inefficiencies are neither linear nor permanent in character. Additionally, the exploitation of an inefficiency can eventually destroy it. If, for instance, a trader exploits an inefficiency using a particular trading strategy then, due to potential information leakage during trading, other market participants can learn about the strategy employed by the trader, and hence the inefficiency, and can subsequently exploit or "arbitrage" it by adapting their own trading strategies in the light of this learned information, thus contributing to the disappearance of the inefficiency. Consequently, a particular financial instrument may only temporarily exhibit a "nonrandom" or "predictable" behavior. Although bubbles of predictability in price movements may quickly disappear through arbitrage, other important financial variables, such as liquidity and market impact, may exhibit more and/or longer lived predictability, especially if they do not obviously lead to profit making opportunities.

Liquidity, in particular, may be of great interest for trades involving large quantities of financial instruments. For instance, with larger "block" trades that are carried out with regard to taking advantage of medium- to long-term price movements, liquidity may be the main determinant of execution performance. A typical situation involves a Portfolio Manager deciding to implement a repositioning of the portfolio. Such repositioning for a large portfolio typically involves large volumes. The Portfolio Manager before requesting that the stock be traded within the boundaries of certain parameters, such as the execution of the trade over a specified time period, wishes to estimate the potential market impact associated with the trade. This is Transaction Cost Analysis (TCA). If potential market impact is high the Portfolio Manager may choose to postpone the trade. To optimize the trade, it may be necessary not only to determine the optimal timeframe for execution of that trade, e.g., the timeframe in which there is sufficient liquidity to support the trade within a specified price range, but also at which particular moments to effect a trade. Current systems for estimating market impact do so based on non-adaptive models that are independent of the trading strategy adopted by the trader and other market participants. However, market impact, depending on liquidity and information leakage, consequently depends on the trading strategies of other market participants as well as the trader's own strategy. An ideal strategy, if feasible, would be for a trader to be able to identify a counterparty who wished to trade the same or similar amount of an instrument and at a price that was mutually acceptable. In reality, and especially in the context of block trades, it may be difficult if not impossible to find such an ideal counterparty.

Difficulties relating to finding an ideal counterparty may be exacerbated by the leakage of information that a party wishes to trade. For example, rumors that a trader wishes to effect a large trade may be exploited by other traders to their own benefit and at the expense of the original trader. Thus, in the real world, a trader may need to protect against the leakage of information that could be exploited by other traders.

Several systems, such as the electronic exchange of Pipeline Trading Systems, are intended to guarantee anonymity and try to match buyers and sellers of large blocks. Systems featuring anonymity and/or matchmaking methodology may have at least two drawbacks. First, liquidity may not be sufficient to provide a high probability of finding a counterparty at any given time. Second, even if a counterparty is found, that counterparty may not be interested or capable of trading the large block in its entirety. In such scenarios, the "excess" must then be traded using a different methodology and often under undesirable conditions.

At least two aspects contribute to optimal trading in this scenario: time and price. A trader cannot wait an unlimited amount of time to execute the trades. Also, a trader must try and obtain an optimal price for trades, and this involves both liquidity and information leakage. These in their turn depend on the trading strategies of other market participants.

A third factor is that optimal trade execution must be obtained potentially across many different financial instruments simultaneously and in real time. Such requirements have opened the door for algorithmic trading engines. Existing trading algorithms, however, tend to be rules-based and non-adaptive.

Artificial Intelligence is a relative newcomer to the field of finance. Many systems for prediction of price movements, however, contain sophisticated elements, such as neural networks and genetic algorithms. These systems may apply highly non-linear analysis and use computationally complex processes whose results can be highly unstable. Additionally, they do not necessarily offer predictions based on established rules, but need to be "tuned" or "trained" by the user, who almost inevitably is not an expert in artificial intelligence and, therefore, likely to produce unreliable results. If the "tuning"

or "training" is successful, the producer of the system can claim credit, and if unsuccessful the producer can blame the client for not training the system well enough. Additionally, training of neural networks or optimization in genetic algorithms, if done correctly, tend to be computationally intensive processes requiring computational resources and resources of time from the client that could better be dedicated to other tasks.

On the forefront of artificial intelligence research are intelligent artificial agent systems, which are now opening new avenues for productivity increases in areas where humans are carrying out repetitive intelligent tasks. Commercial applications of intelligent agents have essentially been restricted to "data mining" where a more intelligent search of databases is carried out. In fact, many such systems are no more sophisticated than standard web search engines.

SUMMARY OF THE INVENTION

In various representative aspects, methods and apparatus for analyzing financial data generally include a predictive modeling system. The predictive modeling system may include an artificial agent responsive to an input data set. The artificial agent may produce an estimated data set including a market conditions data set. The market conditions data may include an estimate of at least one of liquidity of a market, strategy of a counterparty, and an effect of information leakage. The artificial agent may determine a predictability value for the estimated data set. The predictive modeling system may also include an agent factory responsive to the input data set. The agent factory may generate one or more artificial agents in response to the input data set.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various modules for performing various processes, such as receiving data, storing data, algorithm implementations, and the like, which may be executed or implemented in any appropriate manner, such as under the control of one or more microprocessors or other control devices. Similarly, software elements of the present invention may be implemented with any appropriate programming or scripting language, such as C, C++, Java, COBOL, assembler, PERL, eXtensible Markup Language (XML), with the various functions being implemented with any combination of data structures, objects, processes, routines, threads, or other programming elements. Further, the present invention may employ any number of conventional techniques for data transmission, data processing, network control, and the like. Still further, the invention could be used to detect or prevent security issues with a client-side scripting language, such as JavaScript, VBScript or the like.

Various representative implementations of the present invention may be applied to any system for analyzing data. Certain representative implementations may include, for example, systems for predicting fluctuations in the price and/or liquidity of financial instruments, systems for evaluating the market conditions of a specified market, systems for estimating the trading strategy of a counterparty, systems for recommending and/or executing a trade according to an optimized trading strategy, and/or the like.

Figure 1:
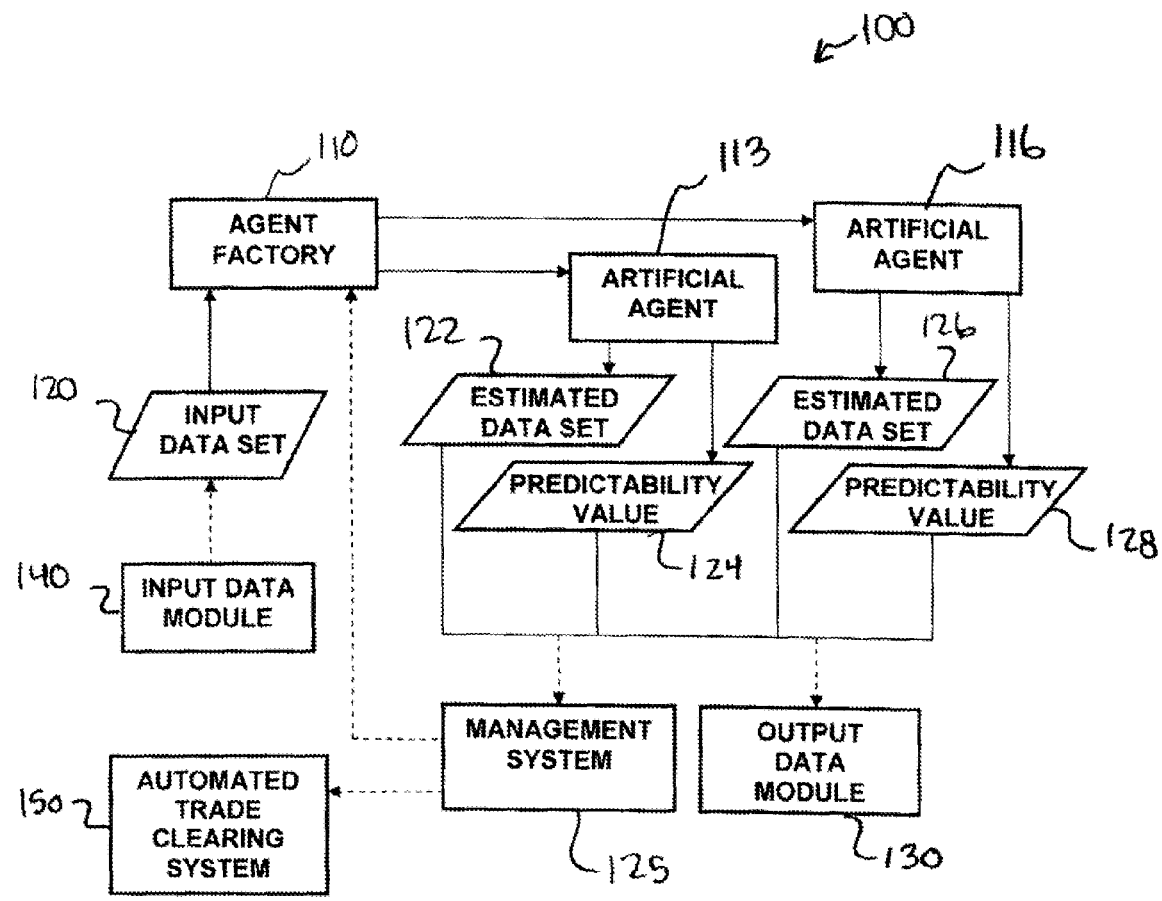
FIG. 1 representatively illustrates a data analysis system.

Referring to FIG. 1, methods and apparatus for analyzing data according to various aspects of the present invention may operate in conjunction with a predictive modeling system 100. The predictive modeling system 100 facilitates creation, development, distribution, management, and/or use of intelligent artificial agents. The predictive modeling system 100 may be adapted for use in conjunction with dynamic systems where prediction plays a fundamental role, such as stock markets, where the agent system may adapt to changing conditions.

For example, the predictive modeling system 100 may be adapted for analyzing one or more financial markets. The predictive modeling system 100 may analyze current and previous financial market activity and provide various estimates of future activity within the financial markets. The predictive modeling system 100 may comprise any elements for receiving and processing information, such as an agent factory 110 to receive an input data set 120, one or more artificial agents 113, 116 to process the input data set 120, and a management system 125 to activate and/or retire the artificial agents 113, 116. Each artificial agent 113, 116 may produce output data, such as an estimated data set 122, 126. In addition, each artificial agent 113, 116 may determine a predictability value 124, 128 for the estimated data set 122, 126.

A predictive modeling system 100 according to various aspects of the present invention utilizes feedback and learning. In the predictive modeling system 100 of FIG. 1, the agents 113, 116 generate certain estimated data sets 122, 126. The predictions are implemented through the output data module 130 and automated clearing system 150. These actions, however, are based on strategies which can affect the market as well as the strategies of other market participants. This, in turn, changes the input data set 120, and the agents 113, 116 adapt and learn in the context of the new input data 120. The new input data, in turn, may change the strategies of the agents 113, 116.

The input data set 120 may comprise any appropriate data that may affect the anticipated projections or operation of the agents 113, 116, or may otherwise be relevant to the analyses performed by the agents 113, 116. The input data set 120 may comprise historical information drawn from a database, information compiled via an automated financial information data system, and/or information otherwise provided, such as via data entry, collection from databases, historical data, or continuous up-to-date information feeds.

The input data set 120 may comprise any relevant information and may be selected and/or adapted according to the nature of the analysis or characteristics of the predictive modeling system 100. For example, in a financial setting, the input data set 120 may include data relating to the history or past behavior of one or more financial instruments and/or information relating to a desired transaction. Data points relating to the history and past behavior of financial instruments may include real-time streaming information specific to a given financial instrument such as price, quotes, order book data, volume, revenue, and/or the like, as well as other more macroeconomic data, such as interest rates, unemployment, and/or the like.

The information included within the input data set 120 may relate to the field in which the predictive modeling system 100 is applied. For example, if the predictive modeling system 100 is to trade municipal bonds, the input data set 120 may comprise information relating to the behavior of municipal bond markets. In addition, the input data set 120 may include any other relevant information, such as information relating to world events, political news, economics, foreign exchange, and the like.

In the present embodiment, the input data set 120 comprises information generally relating to stocks or other instruments and a desired transaction in particular. For example, the agents 113, 116 may be adapted to predict price movement of stocks, and the input data set 120 may include information relating to stocks generally as well as stock-specific information, such as price history, volume history, P/E ratio history, and/or the like. The input data set 120 may further include other macroeconomic information, such as GDP history, unemployment history, interest rate history, and/or the like. Alternatively, the agents 113, 116 may be configured to execute trades, and the input data set 120 may comprise information relating to order book history, tick price movements, trade volumes, and other information that may affect timing, quantities, and prices for trades.

The various categories of information may be represented over various timeframes. For example, the input data set 120 may comprise information relating to the attributes of a specified stock as updated at thirty second intervals and dating back ten years. While this example illustrates one embodiment, the input data set 120 may comprise any appropriate data according to the desired estimated data set and relevant factors affecting the projections.

The input data set 120 may include a trading task data set. The trading task data set may describe parameters relating to a desired transaction or set of transactions. For example, the trading task data set may include information relating to a request to sell stock pursuant to certain condition, such as time, volume, and price conditions.

The trading task data set may comprise a quantified set of requests. For example, the trading task data set may require trading 100,000 shares of a given company's stock within the trading day, preferably within three hours, at a minimum limit price of $30 per share while trying to minimize market impact. The trading task data set may comprise requests for trades relating to one or more stocks, over various timeframes, at various prices, executed with various markets, and/or the like.

The parameters of the trading task data set may be configured for a specified application. For example, parameters relating to bonds, such as tax consequences, may differ from parameters relating to stocks, such as market impact. A trading task data set may include various categories of information according to the particular trading task, such as relating to a specified financial instrument and/or a specified attribute or attributes of a financial instrument.

The input data module 140 supplies the input data set 120 to the agent factory 110. The input data module 140 may comprise any suitable system to receive, store, and/or transmit data, such as the input data set 120. In the present embodiment, the input data module 140 comprises a computer and/or a program configured to receive data from an automated streaming financial market data service and in communication with the agent factory 110. Alternatively, the input data module 140 may comprise a computer memory containing market information, historical data, company and stock information, or other information, including all or part of the input data set 120.

The input data module 140 may collect and/or receive information from any suitable source and manner, such as via an automatic feed, automatically requesting data from other sources, prompting a user for data entry, and the like. For example, the input data module 140 may receive the trading task data set via a computer system to receive instructions from a user. The user may be directed to select from a menu of trading instructions or otherwise provide trading instructions in a manner suited to analysis within the predictive modeling system 100. In the case of a financial data service, such information may be provided to the input data module 140 via a wire and/or a wireless network. Further, the input data set 120 may be input via a portable memory device such as a magnetic or optical memory, a flash drive, an external hard drive, and/or the like.

The input data module 140 may transmit the input data set 120 to the agent factory 110. The manner in which the input data set 120 is transmitted may be adapted to the application and/or environment of the predictive analysis system 100, for example in response to queries from the agent factory 110, at regular intervals, upon receipt and assembly of information, and/or based on importance according to selected criteria. The input data module may provide the input data set 120 as well as any other appropriate information, such as task identification information, setup parameters, or other information that may be relevant to the required analysis.

The agent factory 110 may produce and/or activate the artificial agents 113, 116. The agent factory 110 may comprise any system for processing data, such as a hardware system, a software system, a combination, and/or the like. In the present embodiment, the agent factory 110 comprises a library of analytical techniques, such as various regression techniques, Bayesian models, rules-based algorithms, and genetic algorithms, with which to analyze at least subsets of the input data set 120. The agent factory 110 further comprises a library of trading techniques, including scalping, fading, swing, and/or the like. The analytical techniques, algorithms, processes, and concepts of agent factory 110 may be adapted according to the particular application and/or environment of the predictive modeling system 100.

In one embodiment, the agent factory 110 comprises a database of predictive functions and a database of trading strategies. Generation of the artificial agents 113, 116 may include processing the input data set 120 using the predictive function library and/or the trading strategy library. The agent factory 110 may use only portions of the available data and tools, such as a subset of an input data set 120, a subset of the predictive function library, and a subset of the trading strategy library. For example, the agent factory 110 may generate as many artificial agents 113, 116 as there are combinations of predictive functions and trading strategies within the respective databases. In this way, a variety of predictive functions and a variety of trading strategies may be used to estimate a market fluctuation and estimate the market reaction to a desired trade. Through the use of the predictability values 124, 128, an optimal combination or an optimal set of combinations of data analysis methods and trading techniques may be determined.

The agent factory 110 may comprise one or more systems, subroutines, or modules to generate artificial agents 113, 116 and provide the artificial agents with a simulation or prediction process. The agent factory 110 may receive the input data set 120, initiate the appropriate agents 113, 116, and provide the relevant data to the agents 113, 116. The agent factory 110 may further analyze the performance of the artificial agents 113, 116 and provide information to other systems, control the artificial agents 113, 116, compare their performance, and/or otherwise create, monitor, and manage the artificial agents 113, 116. For example, the agent factory 110 of the present embodiment may comprise the following software routines to generate and control the artificial agents 113, 116: 1) data, 2) run agents, 3) refresh, 4) trends, 5) portfolio, 6) test, 7) quality, 8) temp, 9) select.

The "data" software routine may receive the input data set 120. For example, the "data" routine may request the input data set 120, organize incoming the incoming input data set 120, and/or provide such incoming data to the artificial agents 113.

The "run agents" software routine may activate one or more artificial agents 113, 116 to determine and/or update the estimated data sets 122, 126 and/or predictability values 124, 128. The "run agents" software routine may be automatically activated following a specified fluctuation in the input data set 120.

The "refresh" software routine may identify artificial agents 113, 116 that have been marked as "retired", mark retired artificial agents 113, 116 as placed within a "cemetery" database, and/or activate retired agents 113, 116 that have a comparatively higher predictability value 124, 128. In addition, the "refresh" routine may activate previously retired agents 113, 116 so as to provide a wide range of data analysis techniques.

The "trends" software routine may identify trends among the estimated data sets 122, 126, for example using non-linear consensus rules that identify teams of two or more artificial agents 113, 116 having related estimated data sets 122, 126. As an example, a first artificial agent 113 may produce a first estimated data set 122 and a relatively high predictability value 124. A second artificial agent 113 may produce a second estimated data set 126 indicating a similar future trend with a relatively high predictability value 128. The "trends" routine may identify such artificial agents 113, 116 that appear to generate correlated data. Further, if any artificial agents 113, 116 are outliers as determined by the "trends" routine, such information may be used by the "refresh" routine, for example, to retire outlying artificial agents 113, 116.

The "portfolio" software routine seeks commonalities among the artificial agents 113, 116. For example, these commonalities can be evaluated from a risk and reward analysis. In this implementation, a consensus force is the weighted average of the most accurate trading strategies as evaluated by the artificial agents 113, 116, where the weights are determined by an iterative process that seeks to maximize the ratio of the portfolio's yield to its volatility. The "portfolio" routine manages a set of virtual portfolios that calculate their trading strategies in each financial instrument from the consensus force signal, for example using a proportionality rule, and apply different investor strategies, such as including both investor portfolios and leveraged derivative portfolios.

The "test" software routine may determine performance statistics for the predictive modeling system 100, for example by determining the percentage of artificial agents 113, 116 that produced estimated data sets 122, 126 having predictability values 124, 128 higher than random selection. For example, the estimated data sets 122, 126 produced by the predictive modeling system 100 may be determined to be ten times more accurate than randomly approximating future activity.

The "quality" software routine may monitor the artificial agents 113, 116 to ensure that each parameter of every artificial agent 113, 116 whether active, new, or retired, has the appropriate format and is within lower and upper bounds so that every artificial agent 113, 116 performs according to a user's expectations.

The "temp" software routine may be a predictive modeling technique analyzer configured to test the effectiveness of various predictive modeling techniques over a specified timeframe and evaluate the predictability of each predictive modeling technique.

The "select" software routine may identify accurate predictive modeling techniques among those determined as highly predictive by the "temp" routine and select a subset of such predictive modeling techniques that are comparatively predictable and/or satisfy diversity enforcement criteria that, for example, avoid repeating techniques that are already being used by previously-created artificial agents 113, 116.

The various routines and functions of the agent factory 110 may be implemented in any suitable manner. For example, the various routines and functions may be implemented as hardware and/or software. In addition, the routines and functions may be distributed over multiple physical systems.

The artificial agents 113, 116 may receive data, analyze the data, and produce predictions, data, advisories, and/or other information, and/or may perform additional tasks, such as requesting additional information or executing trades. In an embodiment relating to financial markets and instruments, the artificial agents 113, 116 may analyze a financial market, predict future activity within that market, and/or advise or execute trades. The artificial agents 113, 116 may divide trades into smaller amounts and trade (or recommend trading) the smaller amounts at optimized moments within a specified timeframe that are most appropriate in terms of selected criteria, such as liquidity and market impact.

The artificial agents 113, 116 generate projections based on the input data set 120 and selected algorithms or other criteria, for example predicting price fluctuations and/or expected market impact based on the populated input data set 120 and selected trading strategies, or the expected execution rate of a given trade execution strategy for a trade. In the present embodiment, the artificial agents 113, 116 may predict price fluctuations for a financial instrument based on the financial instrument's prior fluctuations and/or other relevant data, such as related market or economic conditions. For example, each artificial agent 113, 116 may apply a statistical analysis technique, such as a nonlinear regression model, or implement an artificial intelligence element, such as a neural network, to determine a set of indicia to predict a fluctuation in the price of a specified financial instrument over a specified timeframe. The output of this analysis may be compiled within the estimated data set 122.

The artificial agents 113, 116 may comprise any systems for processing data, such as a software programs, hardware systems, or other processing elements. In the present exemplary embodiment, the artificial agents 113, 116 are computer programs, such as artificially intelligent programs, that generate projections and estimates of market conditions and provide trade execution strategies according to the projected or estimated market conditions. Each artificial agent 113, 116 may comprise a software program configured to process the input data set 120 to determine the estimated data set 122 and the predictability value 124.

Each artificial agent 113, 116 operates in conjunction with one or more algorithms, data analysis programs, trading strategy programs, and/or the like selected from a library of such algorithms, data analysis programs, and/or trading strategy programs. In the present embodiment, the library is accessed via the agent factory 110. Accordingly, the first artificial agent 113 may comprise a first data analysis program and simulate the effect of execution of a first trading strategy and the second artificial agent 116 may comprise a second data analysis program and simulate the effect of execution of a second trading strategy.

In addition, through the use of multiple artificial agents 113, 116, various portions of the input data set 120 may be analyzed and various estimates regarding future market activity may be developed. For example, the first artificial agent 113 may be configured to analyze the input data set 120 according to a first data analysis technique and the second artificial agent 116 may be configured to analyze the input data set 120 according to a second data analysis technique. The first artificial agent 113 and the second artificial agent 113 may produce distinct estimated data sets 122, 126 based on the differing data analysis techniques. The artificial agents 113, 116 may also develop predictability the values 124, 128, facilitating selection of the more useful predictive model.

Each artificial agent 113, 116 may be configured to produce a corresponding estimated data set 122, 126. The estimated data set 122, 126 may comprise data relating to the predictive analysis performed by each artificial agent 113, 116, such as a series of various predicted data points. The estimated data set 122, 126 may include a set of projected data points describing the expected behavior of a market, particular financial instrument, or the like. For example, the estimated data set 122 may comprise a predicted fluctuation in the price of a financial instrument, a proposed time for the execution of one or more trades according to a particular trading strategy, a predicted fluctuation in the volume of a financial instrument, the effect of initiation of a specified transaction, the effect of a specified trading strategy, likely strategies of a counterparty, and/or the like.

In the present embodiment, the estimated data set 122, 126 comprises data points relating to expected market activity and/or data points relating to a strategy for an intended transaction. In some instances, such as situations in which liquidity is great and the amount to be traded is relatively small, expected market activity may be substantially independent of whether a user executes a trade. In other circumstances, such as in situations in which liquidity is low and the amount to be traded is relatively large, expected market activity may be substantially related to whether a user executes a trade. Accordingly, at least one artificial agent 113 may be configured to estimate the impact of a trading strategy when determining the estimated data set 122.

If the artificial agent 113 determines that a desired trading task is unlikely to have a market impact, that portion of the analysis may be ignored or given minimal consideration when determining the estimated data set 122. Alternatively, in the event that the artificial agent 113 determines that a desired trading task may have a market impact, that information may be quantified in a market conditions data set. The market conditions data set may comprise data points or other projections relating to the simulated market response to a trading strategy.

The market conditions data set may comprise a subset of the estimated data set 122 and quantify predictions regarding counterparty behavior. For example, the market conditions data set may comprise an estimate of likely counterparty responses, such as an estimate of an increase in the average asking price, due to knowledge that the user wishes to purchase a large quantity of stock. As another example, the market conditions data set may comprise an estimate of the quantity of stock that would become available in response to diffusion of the knowledge that the user wishes to acquire a large quantity of stock. As yet another example, the market conditions data set may comprise an estimate of the extent to which another market participant is likely to imitate the user.

Given the complex set of possible activities, a wide range of analysis tools may be applied to determine the market conditions data set. Each artificial agent 113 may determine the market conditions data set and the most accurate predictions using a different analysis or parameters. The artificial agents 113, 116 may also generate best predictability values 124 to facilitate selection of an appropriate trading strategy.

In the event that the artificial agent 113 determines that execution of a desired trading task will have a substantial impact, the artificial agent 113 may quantify that impact within the market conditions data set. Through quantifying future market activity, the artificial agent 113 may further apply the prediction of market conditions to optimize execution of the desired trading task.

In some circumstances, the impact of a desired trade may be so substantial that a single trade cannot be executed without substantial market reaction. Accordingly, at least one artificial agent 113 may be configured to include within the estimated data set 122 a subtask data set. The subtask data set may comprise information, such as a set of projected data points, for optimizing the subdivision of the trading task across multiple subtasks in accordance with the market conditions data set.

For example, the subtask data set may reflect a determination that an optimal subdivision may be to execute multiple trades in a single market and/or execute multiple trades in multiple markets. Further, a subtask data set may reflect a determination that an optimal subdivision may involve execution of a selected number of trades according to a single trading strategy and/or execution of multiple trades according to different trading strategies. To determine an optimal subdivision, estimates relating to liquidity of various markets, counterparty behavior in response to initiation of a transaction, the effect of leakage of information, and/or the like may be simulated within each artificial agent 113.

The predictability value 124 represents the accuracy of the estimated data set 122 as an estimate of future market activity. The predictability value 124 may thus correspond to a perceived accuracy of the artificial agent's 113 estimated data set 124. Each artificial agent 113, 116 may be configured to produce a predictability value 124, 128 quantifying the accuracy of the analysis of that artificial agent 113, 116.

The predictability value 124 may be assigned to each agent 113, 116 and/or the agent's estimated data set 122, 126 using absolute and/or relative alphanumerical assignments. For example, a first artificial agent 113 may determine that the first artificial agent 113 has predicted market fluctuations to within 95% of their actual eventual value. Accordingly, an absolute predictability value 124 for the first artificial agent 113 may be 95. A second artificial agent 116 that predicted market fluctuations within 80% of their actual eventual value may be assigned a predictability value 128 of 80. To determine a relative predictability value 124, 128, each artificial agent 113, 116 may be configured to rank itself with respect to every other artificial agent 113, 116. For instance, an average predictability value and the standard deviation of such predictability values may be determined for all artificial agents 113, 116 and a relative predictability value 124, 128 assigned accordingly.

The predictability value 124 may be based on reconstruction of a multivariate fitness landscape, which evaluates the ability of an artificial agent 113 to generalize into the future. Landscape reconstruction may be employed to establish the correlation between the past performance of an artificial agent 113 and its expected future performance. "Predictability" may be defined as the statistical expected value of a target variable that measures future performance, such as the agent's 113 predictive accuracy over a specified timeframe, the agent's 113 predictive accuracy with regard to one attribute of a financial instrument or other performance measure, such as the ability to predict large deviations from an expected execution rate. A predictability landscape 300 may be developed by performing a large number of experimental agent runs using historical data and comparing the expected outcome with the actual outcomes.

The predictive modeling system 100 may further include an output data module 130, for example to store, present, transmit, or otherwise use the data of the predictive modeling system 100. The output data module 130 may comprise any system for receiving various data, such as the estimated data sets 122, 126, the predictability values 124, 128, and any other appropriate data generated by the predictive modeling system 100. The output system 130 may perform any appropriate functions for transferring the data to other systems or users, such as storing, transmitting, presenting, or otherwise using the data.

In the present embodiment, the output data module 130 comprises memory to store data and a display system to display at least a portion of the output of the predictive modeling system 100. For example, the output data module 130 may display at least a portion of the estimated data sets 122, 126, such as the estimated data sets 122, 126 generated by the fifty artificial agents 113, 116 having the highest predictability values 124, 128. The display may provide a user with multiple trading strategies and the likely consequences of pursuing each.

The output data module 140 may comprise various systems and/or subsystems. For example, the output data module 140 may also or alternatively comprise a printing system to print the data generated by the predictive modeling system 100. As another example, the output data module 140 may comprise a graphical user interface for navigating and/or selectively displaying estimated data sets 122, 126. Further, the output data module 140 may comprise an interface with which a user may selectively execute a trading strategy.

The management system 125 may monitor and/or control various functions of the predictive modeling system, such as controlling the agents 113, 116 generated by the agent factory, analyzing results of the artificial agents such as the estimated data sets 122, 126 and the predictability values 124, 128, or otherwise managing operations of the predictive modeling system 100. For example, the management system 125 may monitor and selectively retire underperforming artificial agents 113, 116. The management system 125 may comprise any system and/or criteria to evaluate the artificial agents 113, 116, for example based on the agent's 113, 116 predictability value 124, 128.

The management system 125 may be separate from or integrated into the agent factory 110. In the present embodiment, the management system 125 monitors the predictability values 124, 128 of each agent 113, 116 and selectively retires any agent 113, 116 with a predictability value 124, 128 below a selected threshold or meeting other relevant criteria. By retiring underperforming agents 113, 116, the management system 125 may optimize processing efficiency of the predictive modeling system 100.

The management system 125 may also selectively activate retired agents 113, 116. For example, the management system 125 may activate a previously retired agent 113, 116 for a specified duration to determine whether that agent 113, 116 has an associated predictability value 124, 128 above a certain threshold. Because the input data set 120 may fluctuate, an underperforming artificial agent 113, 116 may become a well-performing artificial agent 113, 116 for a different input data set 120.

The predictive modeling system 100 may also include an automated trade clearing system 150 to automatically execute trades. The automated trade clearing system 150 may comprise any system for the execution of a desired trading task. In the present embodiment, the automated trade clearing system 150 comprises an internet enabled trading system, such as those offered by various vendors.

The automated trade clearing system 150 may be adapted according to the application and/or environment of the predictive modeling system 100. In the event that the user has initiated an automatic trading scheme, the automated trade clearing system 150 may execute trades in accordance with the estimated data set 122. For example, the automated trade clearing system 150 may request and authorize trades of stocks identified in the estimated data set 122 at the times and prices indicted in the estimated data set 122. For trading task data sets that the predictive modeling system 100 has determined require subdivision over multiple subtasks, the automated trade clearing system 150 may be configured to execute multiple trades according to at least one of the multiple subtasks within the subtask data set.

In operation, the input data set 120 is provided to the agent factory 110, which provides the relevant data to the various artificial agents 113, 116. Each artificial agent 113, 116 produces an estimated data set 122, 126 and a predictability value 124, 128.

Figure 2:
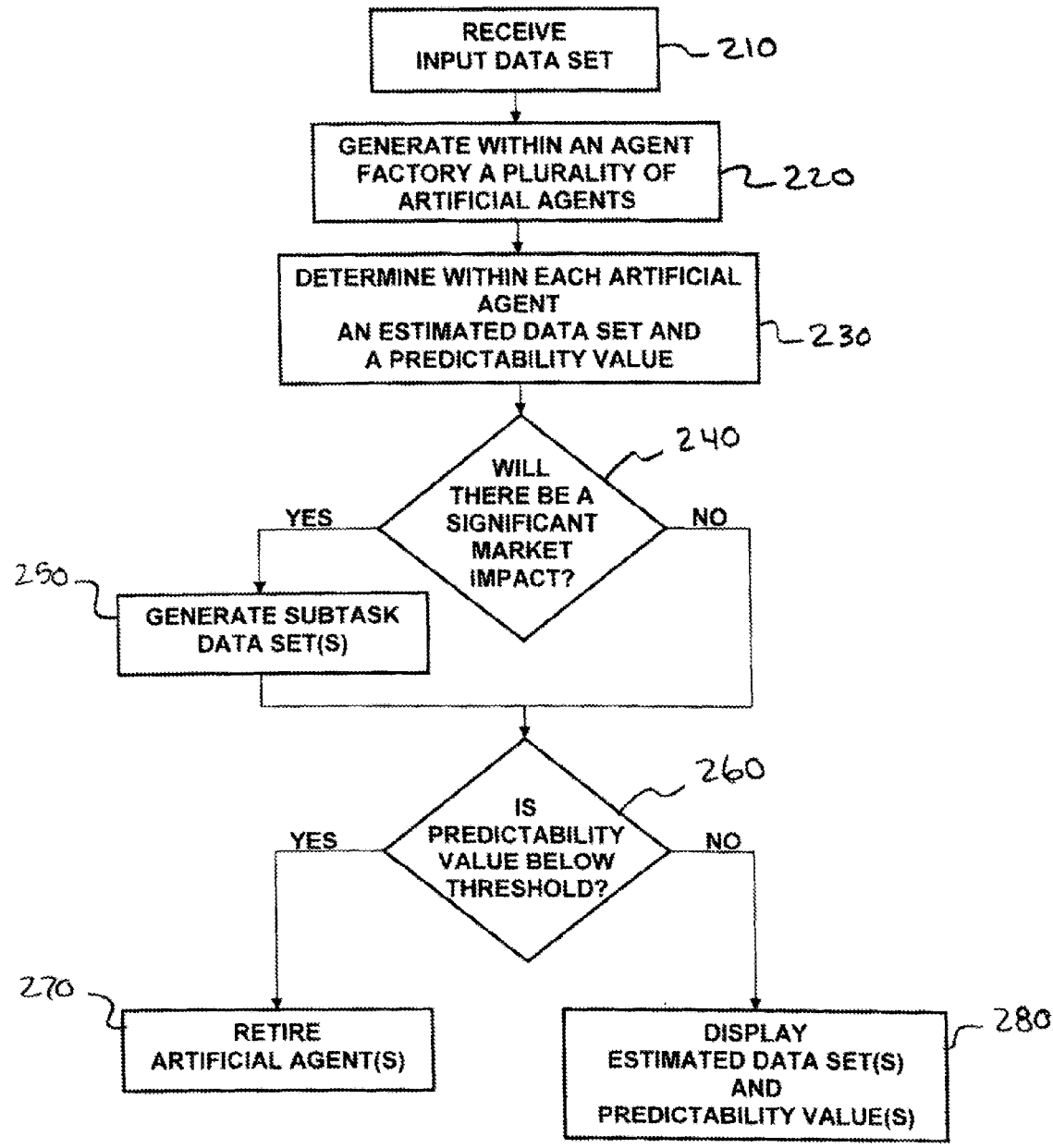
FIG. 2 representatively illustrates a method of analyzing data.

More particularly, referring to FIG. 2, the input data set 120 may be initially received from the input data module 140 and provided to the agent factory 110 (210). For example, the input data set 120 may be transferred from a storage medium into the input data module 140 via cable, wireless transfer, data entry, or other appropriate method. In the present embodiment, the input data set 120 is provided to the agent factory 110 via a connection between the agent factory 110 and the input data module 140. If the agent factory 110 is distributed over multiple networked devices, the input data set 120 may be provided through communication with the input data module 140 likewise distributed over multiple networked devices.

Providing the input data set 120 may include any appropriate systems and processes. For example, the input data set 120 may comprise information that is not ready for processing by the agents 113, 116. Accordingly, the input data module 140 and/or the agent factory 110 may process the input data set 120, for example by reformatting the input data set 120. Additionally, the parameters of the input data set 120 may be identified before data within the input data set 120 can be compiled and/or formatted. As an example, it may necessary to develop, distribute, and/or process historical financial data prior to processing the data.

Upon receipt of the input data set 120, the agent factory 110 may create and/or activate one or more of the artificial agents 113, 116 to process the input data set 120 (220). Each artificial agent 113, 116 may be generated within the agent factory 110 according to various methods, techniques, and/or subroutines. For example, each artificial agent 113, 116 may be generated according to various subroutines, such as "run agents" comprising the agent factory 110. Further, each artificial agent 113, 116 may be preexisting and activated in response to receipt of the input data set 120.

In the present embodiment, each agent 113, 116 is generated by assigning a predictive modeling technique and a trading task to evaluate a portion of the input data set 120. Such assignment may take into consideration whether a predictive modeling technique has already been employed within another agent 116, whether a class of predictive modeling techniques has already been employed within another agent 116, and/or other scenarios to maximize the efficiency of the system 100.

Each artificial agent 113, 116 processes the input data set 120 to produce a corresponding estimated data set 122, 126 and predictability value 124, 128 (230). The estimated data set 122, 126 and the predictability value 124, 128 may be determined via the artificial agent 113 as generated by the agent factory 110 and/or managed by the management system 125.

The estimated data set 122 may be produced according to various methods, techniques, and/or subroutines. For example, each artificial agent 113, 116 may produce a quadratic equation predicting future activity of a financial instrument over some timeframe. Each artificial agent 113, 116 may estimate that a specified fluctuation in price will occur within some specified timeframe. When the predicted behavior is processed against the actual behavior, however, the predicted behavior may not provide a useful estimate in practice, or only a degree of usefulness. Accordingly, the predictability value 124 may be assigned for the estimated data set 122 to quantify the accuracy and/or usefulness of the predicted relationship.

The predictability value 124 may be determined in according to any suitable criteria, process, or technique. For example, the predictability value 124 may be determined by producing a statistical error term, such as the coefficient of determination, that is reflected in the estimated data set 124 with regard to the input data set 120.

As another example, the predictability value 124 may be determined by generating a predictability landscape. Landscape reconstruction is one exemplary embodiment of a process for analyzing past data and determining the predictability value 124, 128 for each agent 113, 116. More specifically, landscape reconstruction may quantify the agent's 113 expected future predictability.

To reconstruct the predictability landscape, a large number of experimental agent runs using historical data may be performed. For example, as applied to a financial instrument, each agent run may comprise:

1) Choosing or creating an agent 113, 116 including a specified analytical technique to determine an estimated data set 122.

2) Computing the expected execution rate and/or the expected fluctuation in one or more attributes of a financial instrument that the agent 113, 116 would have produced for a first portion of the input data set 120.

3) Computing the expected execution rate and/or the expected fluctuation in the attributes of the financial instrument that the agent 113, 116 would have produced for a second portion of the input data set 120.

4) Writing to a database:

(a) The characteristics that represent the class of analytical techniques being applied, i.e., the analytical technique that the agent 113 is using.

(b) The value of various variables describing the input data set 120, such as price, order book, timeframe, liquidity, P/E ratio, interest rates, unemployment, GDP growth rate, a desired transaction, and/or the like.

(c) The value of variables that represent the estimated data set 122, such as a the price at a specified time in the future, liquidity at a specified time in the future, the likely activity of counterparties in response to execution of a desired transaction, and/or the like.

5) Repeat steps 2-4 for different input data sets 120.

6) Repeat steps 1-5 for different agents 113, 116 having different analytical techniques.

The outcome of steps 1-6 is a large database, D, of experimental runs giving, for each run, information on agent 113 type, the estimated data set 122, and the estimated outcome data set.

Figure 4:
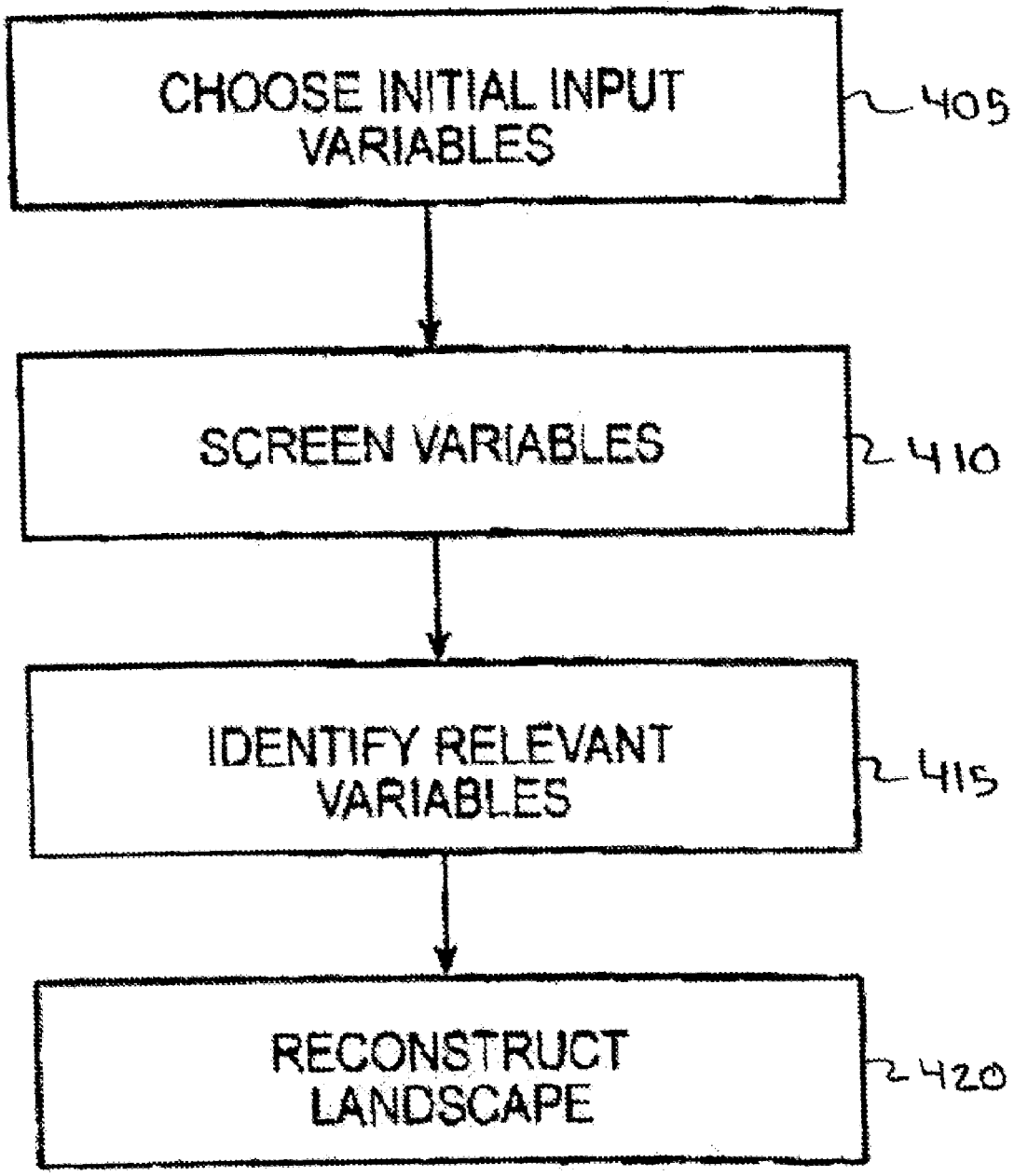
FIG. 4 representatively illustrates a method of determining a data landscape.

The landscape reconstruction process inputs information from this database and performs the following steps as illustrated in FIG. 4:

1) Choose at least a portion of the input data set 120 (405).

2) Select screening criteria (410) on the variables such that each has a more limited domain. For example, an estimated data set 122 may determine that some portions of the input data set 120 cannot be accurately predicted. Accordingly, such members of the input data set 120 may be eliminated prior to landscape reconstruction.

3) Identify relevant variables (415). In one embodiment, a subset of the input data set 120 that correlates strongly and robustly with the target variable over a given time period may be identified. As an example, liquidity may be determined to be highly predictable using a particular analytical technique and a subset of predictor variables in the input data set 120. Price, on the other hand, may be determined to be highly unpredictable using the particular analytical technique with the same subset of predictor variables. The predictor variables would be considered relevant for liquidity as a target variable, but irrelevant for price as a target variable.

4) A space S may be formed by the identified set of relevant variables over the limited domains. A landscape reconstruction may be performed (420) by dividing the space S into elementary cells and assigning a predictability to each cell as the average of the predictabilities associated with the subset of D that corresponds to that cell. Once the predictability landscape has been fixed, any new analytical technique can be assigned a predictability value 124 by determining in which cell the analytical technique fits and assigning the associated predictability value 124.

Figure 3:
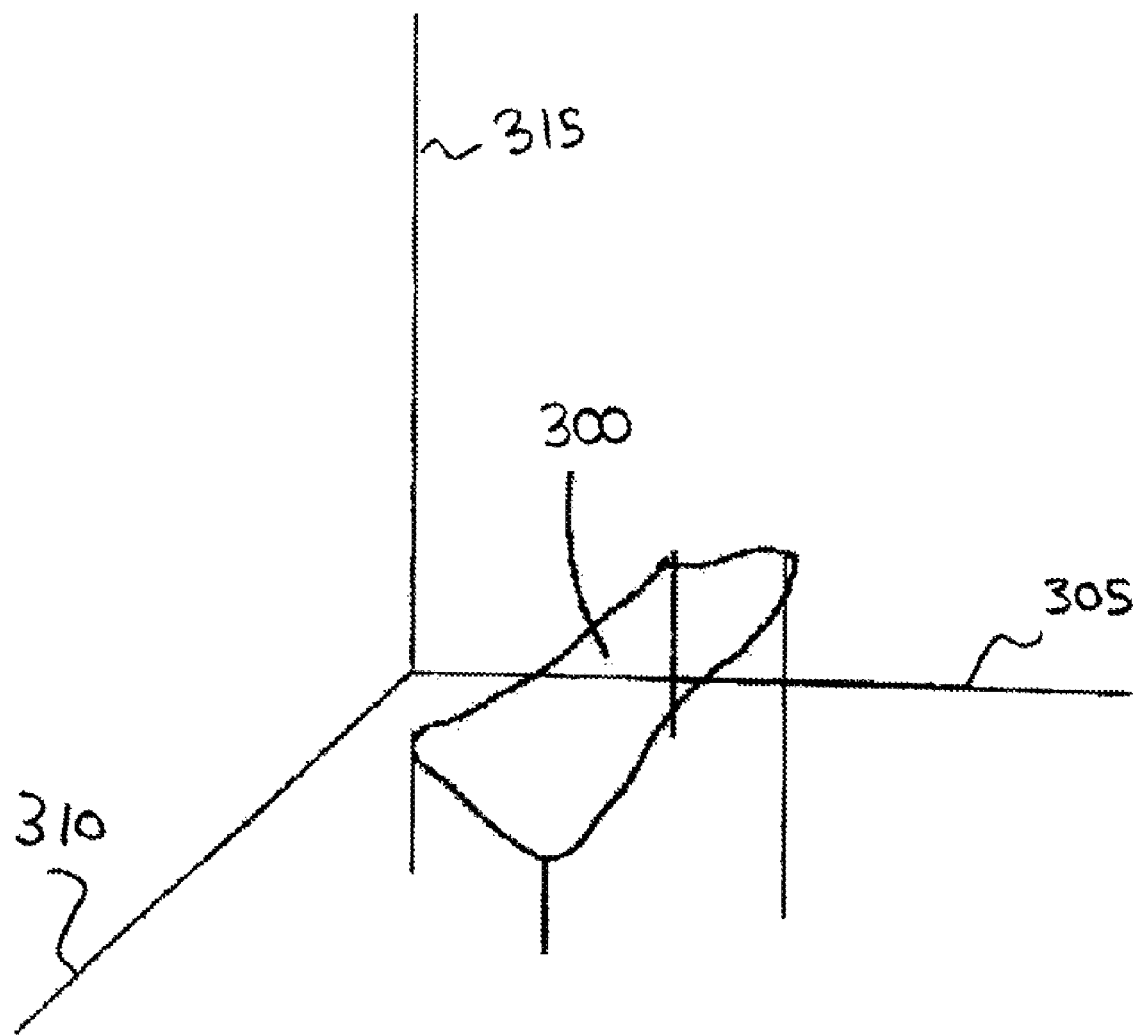
FIG. 3 representatively illustrates a data landscape.

Referring to FIG. 3, a simple landscape reconstruction may include horizontal axes 305, 310 corresponding to selected data points within the input data set 120. A vertical axis 315 corresponds to a set of predictability values 124 as determined via the landscape reconstruction 300 associated with each data point.

Referring again to FIG. 2, one or more of the agents 113, 116 may further determine whether the execution of the desired trading task according to the specified trading strategy is likely to produce a significant market impact (240). More particularly, the estimated data set 122 may include information regarding the market impact of a desired transaction. This information may suggest that the desired transaction cannot be executed in full without substantial adverse consequences. For example, the estimated data set 122 may determine that liquidity is too low to support sale of a block of financial instruments without substantially decreasing the price. As another example, the estimated data set 122 may determine that the effect of an information leak is such that other parties will mimic the desired user transaction. As yet another example, the estimated data set 122 may determine that initiating a trade may cause a counterparty to respond according to a specified trading technique.

Whether the market impact is "significant" may be defined within the input data set 120. For example, the input data set 120 may include instructions relating to sale of a financial instrument. The instructions may be as follows: sell within seven hours, and preferably within three hours, at an average price of at least $30 per share and preferably $32, at least 500,000 and preferably 550,000 shares of stock. A "significant" market impact may accordingly be defined as a market condition in which the sale of the stock causes the average price to be $25 per share.

In the event that the estimated data set 122 indicates that the market conditions are hostile to execution in full of the desired transaction, the predictive modeling system 100 may subdivide the desired transaction across multiple subtasks (250). Continuing the above example, the agent 113 may determine that a single market will support the desired trade if it is confidentially broken into 50 smaller trades, each selling 11,000 shares at $32, over the next 3 hours. A subtask data set may provide data relating to the subdivision of a trading task over multiple markets, execution according to multiple trading strategies, and/or the like.

Each predictability value 124, 128 may be compared with a threshold value (260). The predictability value 124 may be compared against any appropriate threshold value. For example, the management system 125 may be configured to compare the predictability value 124 of each artificial agent 113 to a specified minimum threshold value. If the predictability value 128 is at least as high as the threshold value, the estimated data set 124 and predictability value 128 may be provided to the output data module 130 (280). If the predictability value 124 is lower than the threshold value, the artificial agent 113 that generated that predictability value 124 may be retired (270).

To retire the agent, 113, 116, the artificial agent 113, 116 may be disabled. For example, the artificial agent 113 may be at least temporarily retired with regard to analysis of the input data set 120. However, in the event of a substantial change to the input data set 120 or the introduction of a new data set, the artificial agent 113 may be activated to determine a new estimated data set 122 and a new predictability value 124.

Each estimated data set 122, 126 and each predictability value 124, 128 may be provided to the output data module 130. The output data module 130 may be configured to provide the user with a formatted output screen displaying the estimated data set 122, 126 and/or the predictability value 124, 128 as produced by multiple artificial agents 113, 116. Further, one or more artificial agents 113, 116 may be configured to execute a desired transaction according to the estimated data set 112, 116 via the automated trade clearing system 150.

The particular implementations shown and described are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail. Furthermore, the connecting lines shown in the various figures contained herein are intended to represent exemplary functional relationships and/or physical couplings between the various elements. Many alternative or additional functional relationships or physical connections may be present in a practical system.

Many applications of the present invention could be formulated. The present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described with reference to block diagrams and flowchart illustrations of methods, apparatus (e.g., systems), and computer program products according to various aspects of the invention. Each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A non-transitory computer-readable medium containing instructions for causing a computer system to process data according to a predictive modeling system, the predictive modeling system comprising:
   multiple artificial agents responsive to an input data set corresponding to a past behavior of a financial instrument over time, wherein:
     each artificial agent produces an estimated data set based upon a predictive analysis associated with that artificial agent performed on at least a portion of the input data set, wherein the estimated data set comprises:
       a predicted future behavior of the financial instrument over a predetermined time period based upon a set of indicia corresponding to the past behavior of the financial instrument; and
       a market conditions data set, wherein the market conditions data set comprises an estimate of at least one of liquidity of a market, strategy of a counterparty, and an effect of information leak;
     each artificial agent comprises a different predictive analysis program to produce a distinct estimated data set; and
     each artificial agent determines a predictability value for quantifying an accuracy of the estimated data set produced by that artificial agent as compared to an actual future behavior for the financial instrument over the predetermined time period;
   an agent factory responsive to the input data set, wherein the agent factory produces the artificial agents in response to the input data set; and
   a management system in communication with the agent factory, wherein the management system at least one of activates and retires at least one artificial agent according to that artificial agent's predictability value and a predetermined threshold value.

2. A non-transitory computer-readable medium according to claim 1, wherein:
   the input data set further comprises a trading task data set; and
   the estimated data set further comprises a subtask data set optimizing, in accordance with the market conditions data set, the subdivision of the trading task data set across a plurality of subtasks.

3. A non-transitory computer-readable medium according to claim 2, wherein the plurality of subtasks include at least one of:
   execute a plurality of trades in a specified market,
   execute a plurality of trades in a plurality of specified markets,
   execute a plurality of trades according to a specified trading strategy, and
   execute a plurality of trades according to a plurality of specified trading strategies.

4. A non-transitory computer-readable medium according to claim 1, further comprising an input data module in communication with the agent factory, wherein the input data module at least one of selectively receives, selectively stores, and selectively transmits the input data set.

5. A non-transitory computer-readable medium according to claim 1, further comprising an output data module in communication with the agent factory, wherein the output data module selectively displays at least a portion of at least one estimated data set and at least one predictability value.

6. A non-transitory computer-readable medium according to claim 2, further comprising an automated trade clearing system in communication with the agent factory, wherein the automated trade clearing system selectively executes at least one trade according to at least one of the plurality of subtasks.

7. A computer-implemented method for predictive modeling, comprising:
   receiving an input data set within an agent factory, wherein the input data set corresponds to a history of a financial instrument;
   generating multiple artificial agents within the agent factory in response to the input data set, wherein each artificial agent comprises a different predictive analysis program to produce a distinctive estimated data set;
   determining by the computer via each artificial agent an estimated data set based upon a predictive analysis associated with that artificial agent performed on at least a portion of the input data set, wherein the estimated data set comprises:
     a predicted future behavior of the financial instrument over a predetermined time period based upon a set of indicia corresponding to the past behavior of the financial instrument; and
     a market conditions data set, wherein the market conditions data set comprises an estimate of at least one of liquidity of a market, strategy of a counterparty, and an effect of information leak; and
   determining by the computer via each artificial agent a predictability value for quantifying an accuracy of the estimated data set produced by that artificial agent as compared to an actual future behavior for the financial instrument over the predetermined time period.
   at least one of activating and retiring at least one artificial agent according to the predictability value and a predetermined threshold value via a management system, wherein the management system is in communication with the agent factory.

8. A computer-implemented method according to claim 7, wherein:
   the input data set further comprises a trading task data set; and
   the estimated data set further comprises a subtask data set optimizing, in accordance with the market conditions data set, the subdivision of the trading task data set across a plurality of subtasks.

9. A computer-implemented method according to claim 8, wherein the plurality of subtasks include at least one of:
   execute a plurality of trades in a specified market,
   execute a plurality of trades in a plurality of specified markets,
   execute a plurality of trades according to a specified trading strategy, and
   execute a plurality of trades according to a plurality of specified trading strategies.

10. A computer-implemented method according to claim 7, further comprising:
at least one of selectively receiving, selectively storing, and selectively transmitting data to the agent factory via an input data module, wherein the input data module is in communication with the agent factory.

11. A computer-implemented method according to claim 7, further comprising:
selectively displaying at least one estimated data set and at least one predictability value via an output data module, wherein the output data module is in communication with the agent factory.

12. A computer-implemented method according to claim 8, further comprising:
selectively executing at least one trade according to at least one of the plurality of subtasks via an automated trade clearing system, wherein the automated trade clearing system is in communication with the agent factory.

13. A computer-implemented method for causing a computer to engage in trading financial instruments, comprising:
receiving an input data set within an agent factory, wherein the input data set:
corresponds to a past behavior of a financial instrument over time; and
comprises a trading task data set;
generating multiple artificial agents within the agent factory in response to the input data set, wherein each artificial agent comprises a predictive analysis program to produce a distinct estimated data set;
determining by the computer via each artificial agent an estimated data set based upon a predictive analysis associated with that artificial agent performed on at least a portion of the input data set, wherein:
the estimated data set comprises:
a predicted future behavior of the financial instrument over a predetermined time period based upon a set of indicia corresponding to the past behavior of the financial instrument; and
a market conditions data set;
the market conditions data set comprises an estimate at least one of liquidity of a market, strategy of a counterparty, and an effect of information leak; and
the estimated data set further comprises a subtask data set optimizing, in accordance with the market conditions data set, the subdivision of the trading task data set across a plurality of subtasks; and
determining by the computer via each artificial agent a predictability value for quantifying an accuracy of the estimated data set produced by that artificial agent as compared to an actual future behavior for the financial instrument over the predetermined time period; and
at least one of activating and retiring at least one artificial agent according to the predictability value and a predetermined threshold value via a management system, wherein the management system is in communication with the agent factory.

14. A computer-implemented method according to claim 13, wherein the plurality of subtasks includes at least one of:
execute a plurality of trades in a specified market,
execute a plurality of trades in a plurality of specified markets,
execute a plurality of trades according to a specified trading strategy, and
execute a plurality of trades according to a plurality of specified trading strategies.

15. A computer-implemented method according to claim 13, further comprising:
at least one of selectively receiving, selectively storing, and selectively transmitting data to the agent factory via an input data module, wherein the input data module is in communication with the agent factory.

16. A computer-implemented method according to claim 13, further comprising:
selectively displaying at least one estimated data set and at least one predictability value via an output data module, wherein the output data module is in communication with the agent factory.

17. A computer-implemented method according to claim 13, further comprising:
selectively executing at least one trade according to at least one of the plurality of subtasks via an automated trade clearing system, wherein the automated trade clearing system is in communication with the agent factory.

18. A computer-implemented method for causing a computer to execute a transaction cost analysis, comprising:
receiving an input data set within an agent factory, wherein the input data set corresponds to a history of a transaction over time;
generating multiple artificial agents within an agent factory in response to the input data set, wherein each artificial agent comprises a different predictive analysis program to produce a distinct estimated data set;
determining by the computer via each artificial agent an estimated data set based upon a predictive analysis associated with that artificial agent performed on at least a portion of the input data set, wherein the estimated data set comprises:
a predicted future behavior of the transaction over a predetermined time period based upon a set of indicia corresponding to the past behavior of the transaction; and
an estimate of at least one of liquidity of a market, a desired strategy, a potential strategy of a counterparty, and an effect of information leak; and
determining by the computer via each artificial agent a predictability value for quantifying an accuracy of the estimated data set produced by that artificial agent as compared to an actual future behavior of the transaction over the predetermined time period; and
at least one of activating and retiring at least one artificial agent according to the predictability value and a predetermined threshold value via a management system, wherein the management system is in communication with the agent factory.

19. A computer-implemented method according to claim 18, further comprising:
at least one of selectively receiving, selectively storing, and selectively transmitting data to the agent factory via an input data module, wherein the input data module is in communication with the agent factory.

20. A computer-implemented method according to claim 18, further comprising:
selectively displaying at least one estimated data set and at least one predictability value via an output data module, wherein the output data module is in communication with the agent factory.

21. A computer-implemented method according to claim 18, further comprising selectively executing at least one trade according to at least one of the plurality of subtasks via an automated trade clearing system, wherein the automated trade clearing system is in communication with the agent factory.

22. A computer-implemented method according to claim 18, further comprising determining via each artificial agent an outcome data set comprising at least one of an average market impact and a strategy dependent market impact.

* * * * *